Aug. 1, 1950      S. C. ROCKAFELLOW      2,517,242
PULSE TIMED HOLDING RELAY
Filed Aug. 19, 1949
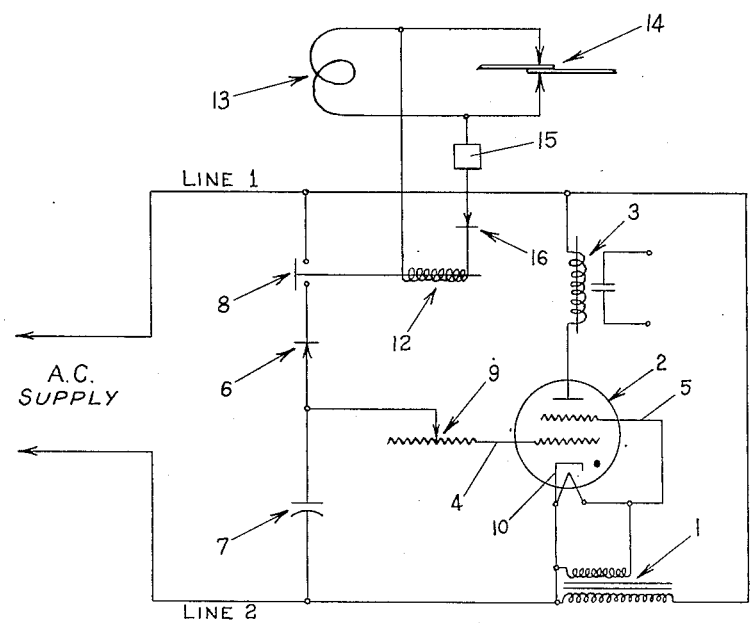
fig. 1
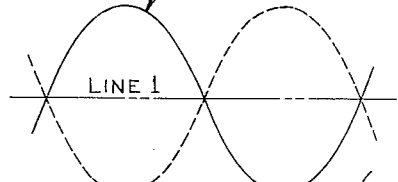
fig. 2
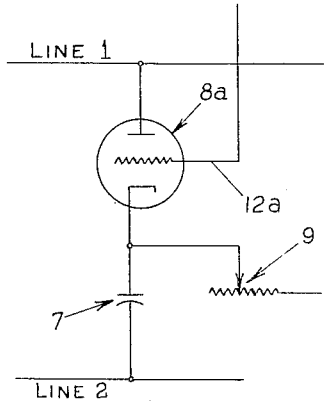
fig. 3
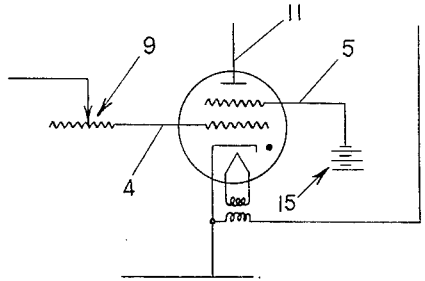
fig. 4
Inventor
STUART C. ROCKAFELLOW
Attorney Patented Aug. 1, 1950

2,517,242

UNITED STATES PATENT OFFICE 2,517,242

PULSE TIMED HOLDING RELAY

Stuart C. Rockafellow, Farmington, Mich., assignor to Robotron Corporation, Detroit, Mich., a corporation of Michigan Application August 19, 1949, Serial No. 111,290

5 Claims. (Cl. 315—275)

This invention relates to time delay relays of the type wherein the relay remains energized for a predetermined time after the action of an initiation means has ceased.

Particularly, it is often desirable to maintain a relay in a predetermined condition, as closed, for so long as a certain condition, as a series of predetermined pulsations from another circuit, continues. For example, in automatic electric welding equipment it is desirable to have cooling water flowing through selected parts of the machine, such as through the transformer or the electrodes, so long as pulsations are being fed to the electrodes, to continue to flow for a predetermined time after said pulsations have terminated, in order to cool the various parts, and then to shut off. Therefore, in a welding machine it is desirable to provide an automatic valve timed to any convenient pulsations, such as the energization of the electrodes, by which the water valve will be immediately opened when the electrode pulsations start, held open, for so long as the pulsations persist, and continue to be held open for a period of time after the weld ceases, and then closed. Further, in order to avoid the valve's staying open improperly due to any malfunctioning of the equipment, it is preferable that the normal, non-operating, condition of the control circuit be such as to hold the valve closed excepting as the circuit operates properly to open it.

Accordingly, a principal object of this invention is to provide an electric control circuit to hold a relay closed for so long as predetermined pulsations of current are applied to said circuit at intervals not exceeding a predetermined maximum, to hold it closed for a predetermined time after the last one of a series of pulsations has ceased and then to permit it to open.

A further object of the invention is to provide a circuit as aforesaid wherein the malfunctioning of any part thereof will permit the relay to open.

A further object of the invention is to provide a circuit as aforesaid which will be simple to construct and maintain but which will be accurate and reliable in operating.

In meeting these objects and purposes, and others incidental thereto and associated therewith, I have provided a circuit wherein a constant bias is applied to one of two control electrodes of an electronic discharge device of the gas-filled type, commonly referred to as a "thyratron," to prevent a current from passing therethrough and an operating potential controlled by said pulsating potential is applied both to the other control electrode, to cancel the effect of the bias potential and permit a current to pass said discharge device, and to a capacitance which will hold the cancelling potential on the other control electrode after each pulse of said pulsating potential for a limited, determinable period. Thus, so long as the pulses continue with no more than a particular maximum interval between them, the bias potential remains cancelled and the discharge device passes current by which a relay may be held closed. As soon as the interval exceeds said particular maximum, the cancelling potential is terminated, the bias potential resumes control, current passage stops and the relay opens.

The invention will be better understood from the following description taken in connection with the accompanying drawings.

Figure 1 of the drawing which is a circuit diagram illustrating an embodiment of this invention.

Figure 2 is a schematic indication of the voltage pulsations in the source and in the shield grid.

Figure 3 is a fragmental showing of an alternative circuit utilizing an electron discharge device in place of the mechanical switch and rectifier shown in Figure 1.

Figure 4 is a fragmental showing of a further modification in which the bias voltage on the shield grid is supplied by a battery.

In Figure 1, L1—L2 represent the leads of a source of alternating current. Transformer 1 is of the common filament type having each side of its primary winding connected to each of said leads, respectively, and the secondary winding connected to the filament of an electronic discharge device 2. The discharge device 2 is of conventional type and has a cathode, connected to one side of the source of alternating current, an anode, connected in series with a relay 3 to the other side of the alternating current source, and two grids, one commonly called a control grid 4 and the other a shield grid 5. All the elements in the discharge device are in a gas filled enclosure and the device is commonly called a "Thyratron." Transformer 1 has its secondary phased in such a manner as to give a negative pulse to the shield grid 5 when the supply to the anode is positive as diagrammatically illustrated in Figure 2. Thus the control device is rendered non-conductive by having a negative potential on the shield grid.

A rectifier 6 passes current in only one direction, and is arranged in series with a capacitor 7 and a switch 8 across the alternating current source. When switch 8 is closed the capacitor 7 charges to a positive value at the rectifier side. The switch 8 may, of course, be associated with any of many possible controlling circuits. In the specific embodiment here adopted for illustrative purposes, said switch is mechanically operated by a solenoid 12 which is connected across the circuit between a transformer primary 13 and a pair of welding electrodes 14. Said switch circuit may have a resistance 15 and a rectifier 16, both of conventional form and characteristics, to place a suitable, unidirectional potential onto the one switch solenoid. It will be evident in the light of the foregoing that any other kind of switch, or switch actuating means, may be substituted for the herein illustrated and described without altering the scope of this invention.

Connected between rectifier 6 and capacitor 7 is a variable resistance 9 fed in series to the control grid 4 of discharge device. When the capacitor 7 is charged to a positive value at the rectifier end, a positive charge is imposed onto the control grid which charge is materially greater than the charge imposed onto the shield grid. Any conventional means may be employed to control the relative values of these charges in accordance with the characteristics of the discharge device 2. This positive charge on the control grid overcomes the negative charge on the shield grid 5 and the control device becomes conductive, thus allowing current to flow through the relay 3 which in turn energizes whatever external circuit is connected thereto, such as a solenoid operating the water valve for a welding machine.

When the switch 8 is opened, the charging to the capacitor 7 is stopped and the capacitor starts to discharge through variable resistor 9 and the arc drops from grid 4 to cathode 10 of the discharge device. When the positive charge on the capacitor 7 finally drains to a low enough value, a point will be reached where the negative voltage on the shield grid will have the greater effect and the control device will be rendered non-conductive thus denergizing the relay in the anode circuit. This opens the relay contacts and deenergizes the external load.

For an example, assume that the variable resistor 9 is set to such a value to hold the control device conducting for a period of one minute after the switch 8 has been opened. Then within one minute after any given pulse from the welding circuit, if another such pulse occurs so that switch 8 is again closed, the capacitor will be kept charged at a high enough level to keep the necessary cancelling potential on the control electrode 4. Thus, if the switch 8 is closed and opened at periods not exceeding one minute, the control device will remain conducting and the relay 3 remains continuously energized. However, when the intervals between pulses from the welding circuit exceed one minute, then the capacitor discharges to a point such that the potential on the control electrode becomes sufficiently low that the shield electrode assumes control, the discharge device becomes non-conductive and the relay 3 becomes deenergized, thus opening the external circuit.

It can be readily seen, in view of the foregoing, that several variations of the above are possible. The switch 8 might be replaced as indicated in Figure 3, by a control discharge device 8a which would also serve as the rectifier 6 and the pulses to it controlled by a suitable grid 12a therewithin. Further, as shown fragmentarily in Figure 4, the shield grid 5 may have battery 15 or other means of bias supplied to it rather than the alternating current method of negative bias as shown.

Still other variations may be made in the details of the circuit shown, but such variations will all be within the scope of the invention excepting as specifically provided herein, or as specifically required by the claims hereinafter following.

I claim:

1. A control device for holding a relay continuously energized so long as electrical base pulses are supplied at a predetermined minimum frequency, the combination: a pair of leads connectable to a source of alternating potential; an electron discharge device having an anode, a cathode and a pair of control electrodes, said leads being continuously connected with said anode and said cathode, respectively, and including said relay in series in the anode circuit; means applying to one control electrode a first potential of value with respect to said alternating potential at any given time sufficient to block electron passage through said discharge device; a switch, a rectifier and a capacitance connected in series with each other and connected between said leads with said switch on the side thereof connected to said anode; a connection between said other control electrode and a point between said rectifier and said capacitance, the sense of said rectifier being such that the potential imposed on said other control electrode is of opposite sign to that imposed on said one control electrode and means controlling the value of its potential at such a level that it will overcome the blocking effect of said first potential whenever said switch is closed; means closing said switch each time one of said base pulses is supplied; whereby aid discharge device will remain conductive so long as said capacitance remains charged to a predetermined level and it will be so charged so long as said base pulses are imposed to close said switch with sufficient rapidity to charge said capacitance faster than its charge can drain off through said other control electrode in said tube.

2. The combination defined in claim 1 wherein said one controlled electrode is connected directly to said cathode circuit and is energized thereby.

3. A control device for holding a relay continuously energized so long as electrical base pulses are supplied at a predetermined minimum frequency, the combination: a pair of leads connectable to a source of alternating potential independent of said base pulses; an electron discharge device having an anode, a cathode and a pair of control electrodes, said leads being continuously connected with said anode and said cathode, respectively, and including said relay in series in the anode circuit; means applying to one control electrode a first potential of value with respect to said alternating potential at any given time sufficient to block electron passage through said discharge device; a rectifier and a capacitance connected to each other and means responsive only to said base pulses supplying said rectifier and capacitance with energy at each occurrence at one of said base pulses; a connection between said other control electrode and a point between said rectifier and said capacitance; the sense of said rectifier with respect to the polarity of said intermittent pulses being such that the potential imposed upon said other control electrode is of opposite sign to that imposed on said one control electrode; and the means supplying said pulses being so related in magnitude to said source of alternating potential that the energizing of each of said control electrodes will occur at such respective potentials that the potential on said other control electrode will overcome the blocking effect of the potential on said one control electrode; whereby said discharge device will remain conductive so long as said capacitance remains charged to a predetermined level and it will be so charged so long as said base pulses occur with sufficient rapidity to charge said capacitance faster than its charge can drain off through said other control electrode in said tube.

4. A control device for holding a relay continuously energized so long as electrical base pulses are supplied at a predetermined minimum frequency, the combination: a pair of leads connectable to a source of regularly alternating potential independent of said base pulses; an electron discharge device having an anode, a cathode and a pair of control electrodes, said leads being continuously connected with said anode and said cathode, respectively, and including said relay in series in the anode circuit; means applying to one control electrode a first potential of value with respect to said alternating potential at any given time sufficient to block electron passage through said discharge device; a capacitance and means controlled solely by said base pulses for supplying electrical energy applying said base pulses uni-directionally thereto; means connecting said capacitance to said other control electrode, and the strength and sense of said base pulses being such that said other control electrode will neutralize the blocking effect of said one control electrode; means controlling the application of said pulses to said capacitance; whereby said discharge device will remain conductive so long as said capacitance remains charged to a predetermined level and it will be so charged so long as said base pulses occur with sufficient rapidity to charge said capacitance faster than its charge can drain off through said other control electrode in said tube.

5. A control device for holding a relay continuously energized so long as electrical base pulses are supplied from a pilot source at a predetermined minimum frequency, the combination: a source of alternating potential independent of said pilot source; a pair of leads connected to said source; an electron discharge device having an anode, a cathode and a pair of control electrodes, said leads being continuously connected with said anode and cathode, respectively, and including said relay in series in the anode circuit; means applying to one control electrode a first potential of value with respect to said alternating potential at any given time sufficient to block electron passage through said discharge device; a switch, a rectifier and a capacitance connected in series with each other and connected between said leads, and means wholly independent of said source of alternating potential for closing said switch each time one of said base pulses is supplied; a connection between said other control electrode and a point between said rectifier and said capacitance, the sense of said rectifier being such that the potential imposed on said other control electrode is of opposite sign to that imposed on said one control electrode and means controlling the value of its potential at such a level that it will overcome the blocking effect of said first potential whenever said switch is closed; whereby said discharge device will remain conductive so long as said capacitance remains charged to a predetermined level, and it will be so charged so long as said base pulses are imposed to close said switch with sufficient rapidity to charge said capacitance faster than its charge can drain off through said other control electrode in said tube.

STUART C. ROCKAFELLOW.

REFERENCES CITED

The following references are of record in the file of this patent:

UNITED STATES PATENTS

| Number | Name | Date |
| --- | --- | --- |
| 1,867,398 | Crockrell | July 12, 1932 |
| 2,084,159 | Mittag | June 15, 1937 |
| 2,195,996 | Palmer | Apr. 2, 1940 |
| 2,476,882 | Lexa | July 19, 1949 |